United States Patent
Griot

(10) Patent No.: US 9,781,628 B2
(45) Date of Patent: Oct. 3, 2017

(54) METHODS AND APPARATUS FOR THROTTLING UNATTENDED APPLICATIONS AT USER DEVICES

(71) Applicant: QUALCOMM Incorporated, San Diego, CA (US)

(72) Inventor: Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/282,164

(22) Filed: May 20, 2014

(65) Prior Publication Data
US 2014/0347983 A1 Nov. 27, 2014

Related U.S. Application Data

(60) Provisional application No. 61/825,972, filed on May 21, 2013.

(51) Int. Cl.
*H04L 29/08* (2006.01)
*H04W 28/02* (2009.01)
(Continued)

(52) U.S. Cl.
CPC ....... *H04W 28/0289* (2013.01); *H04L 47/263* (2013.01); *H04L 67/2828* (2013.01); *H04L 41/0896* (2013.01); *H04L 41/5003* (2013.01)

(58) Field of Classification Search
CPC ... H04L 67/306; H04L 65/4084; H04L 65/80; H04L 67/02; H04L 67/2828; H04L 41/5003; H04L 41/0896; H04L 43/0882
See application file for complete search history.

(56) References Cited

U.S. PATENT DOCUMENTS

| 7,346,000 B1 * | 3/2008 | Srinivasan | .......... H04L 41/0896 370/235 |
| 2008/0165747 A1 * | 7/2008 | Budka | ............... H04W 72/1284 370/337 |

(Continued)

FOREIGN PATENT DOCUMENTS

EP    2367388 A1    9/2011

OTHER PUBLICATIONS

"3rd Generation Partnership Project; Technical Specification Group Services and System Aspects; Feasibility study on user plane congestion management (Release 12)," 3GPP Standard; 3GPP TR 22.805, 3rd Generation Partnership Project (3GPP), Mobile Competence Centre; 650, Route Des Lucioles; F-06921 Sophia-Antipolis Cedex; France, vol. SA WG1, No. V12.1.0, Dec. 14, 2012 (Dec. 14, 2012), pp. 1-36, XP050691071, [retrieved on Dec. 14, 2012] pp. 8-9, 11-13, 15, 21.

(Continued)

*Primary Examiner* — Raj Jain
(74) *Attorney, Agent, or Firm* — Patterson & Sheridan, L.L.P.

(57) ABSTRACT

Aspects of the present disclosure provide methods, apparatus and computer program products for throttling unattended applications at user devices (e.g., in an effort to limit transmission resource consumption by a user equipment (UE)). According to an aspect, the UE may receive an indication to restrict (throttle down) flow for traffic that appears to be unattended by a user. The UE may determine if a particular application is subject to flow restriction; and restrict flow of uplink traffic generated by the application, if the application is subject to flow restriction. Numerous other aspects are provided.

30 Claims, 7 Drawing Sheets

(51) Int. Cl.
*H04L 12/825* (2013.01)
*H04L 12/24* (2006.01)

(56) References Cited

U.S. PATENT DOCUMENTS

| | | |
|---|---|---|
| 2010/0157814 A1 | 6/2010 | Ha et al. |
| 2011/0082924 A1* | 4/2011 | Gopalakrishnan .. H04L 65/4084 709/223 |
| 2012/0265897 A1 | 10/2012 | Das et al. |
| 2014/0347983 A1* | 11/2014 | Griot ................ H04W 28/0289 370/230 |

OTHER PUBLICATIONS

International Search Report and Written Opinion—PCT/US2014/038905—ISA/EPO—Feb. 3, 2015.
QUALCOMM et al., "Key Issue—Uplink Traffic Prioritization", 3GPP Draft; S2-131399WASS2-131091_UPCON_UPLINKTRAFFICPRIORITIZATION_V4, 3rd Generation Partnership Project (3GPP), Mobile Competence Centre; 650, Route Des Lucioles; F-06921 Sophia-Antipolis Cedex; vol. SA WG2, no. San Diego, California, USA; Apr. 8, 2013-Apr. 12, 2013 Apr. 13, 2013 (Apr. 13, 2013), XP050708618, Retrieved from the internet: URL: http://www.3gpp.org/ftp/tsg_sa/WG2_Arch/TSGS2_96_San_Diego/Docs/[retrieved on Apr. 13, 2013].

* cited by examiner

METHODS AND APPARATUS FOR THROTTLING UNATTENDED APPLICATIONS AT USER DEVICES

CROSS-REFERENCE TO RELATED APPLICATIONS

The present Application for Patent claims priority to U.S. Provisional Application No. 61/825,972, filed May 21, 2013, which is assigned to the assignee of the present application and hereby expressly incorporated by reference herein in its entirety.

FIELD

Certain aspects of the present disclosure generally relate to wireless communications and, more particularly, to apparatus and techniques for throttling unattended applications at user devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system. To efficiently transmit and receive information, signals are usually encoded into a special format before transmission and decoded by a receiver after reception. Numerous encoding and decoding methods exist, with each presenting advantages and challenges, as well.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). LTE provides for an uplink speed of up to 75 megabits per second (Mbps) and a downlink speed of up to 300 Mbps, and brings many technical benefits to cellular networks. LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier-Frequency Division Multiple Access (SC-FDMA) on the uplink. OFDMA allows data to be directed to or from multiple users on a subcarrier-by-subcarrier basis for a specified number of symbol periods.

SUMMARY

Certain aspects of the present disclosure provide a method for wireless communication by a user equipment (UE). The method generally includes receiving an indication to modify flow for traffic generated by one or more applications, determining if a particular application is subject to flow modification, and modifying flow of uplink traffic generated by the particular application, if the particular application is subject to flow modification.

Certain aspects of the present disclosure provide a method for wireless communication by a base station (BS). The method generally includes transmitting an indication for one or more user equipments (UEs) to modify flow of uplink traffic generated by one or more applications.

Certain aspects of the present disclosure also provide various apparatuses and program products for performing the operations described above.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

Figure 1:
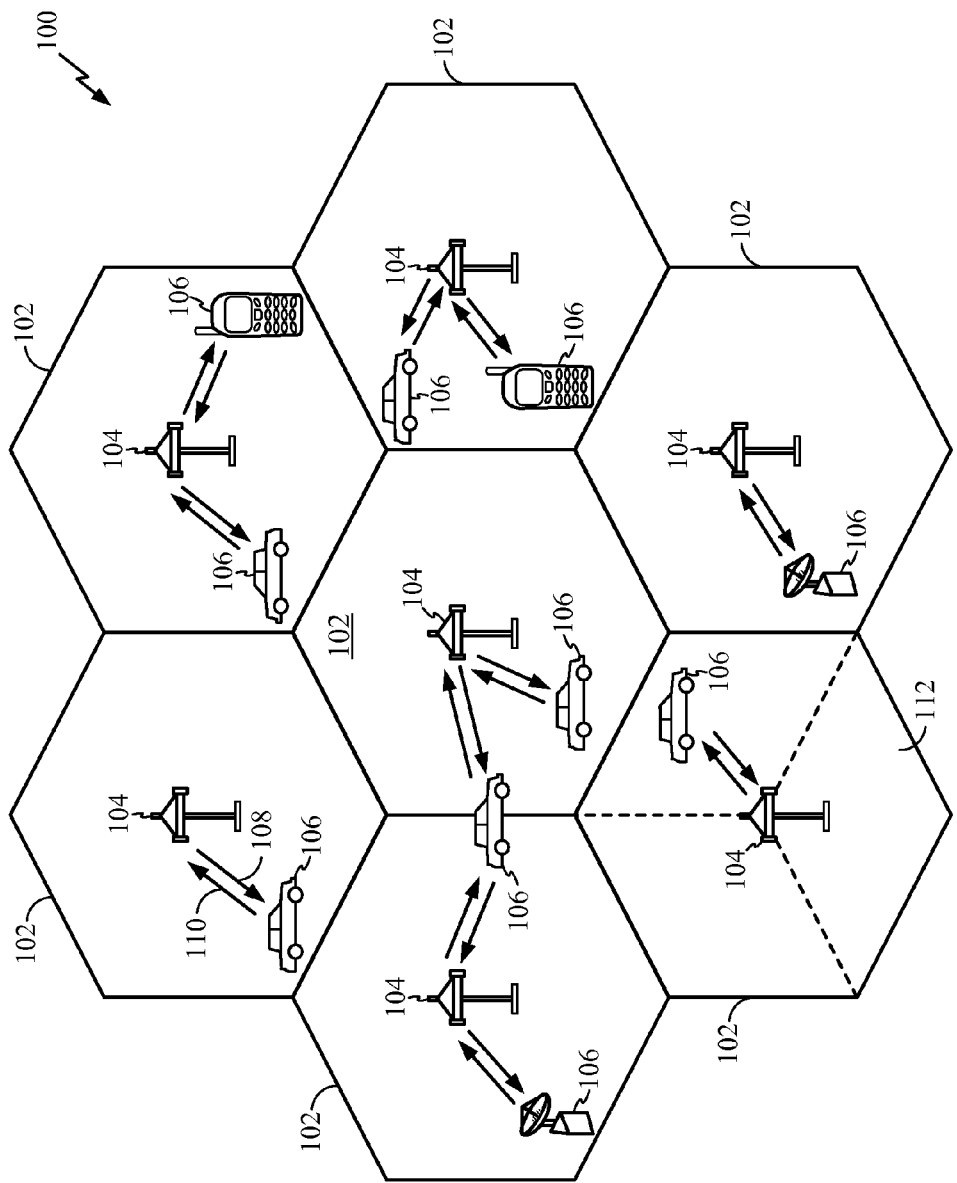
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Telecommunications System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, a mobile unit, a wireless unit, a remote unit, a mobile device, a wireless device, a wireless communication device, a remote device, a mobile subscriber station, a mobile terminal, a wireless terminal, a handset, a mobile client, a client, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects a node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, evolved Node B (eNB), a base transceiver station, a radio base station, a radio transceiver, a transceiver function, a basic service set (BSS), an extended service set (ESS), or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
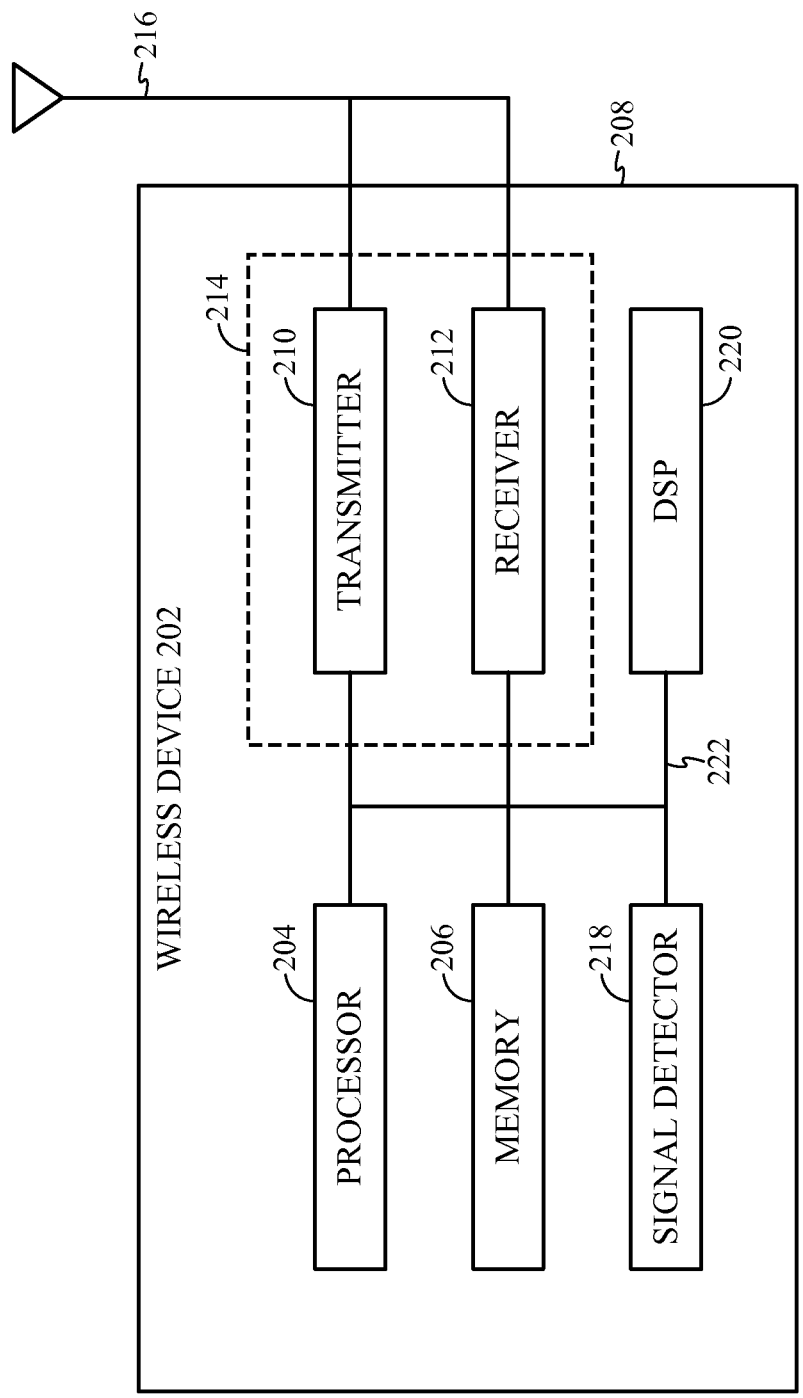
FIG. 2 illustrates various components that may be utilized in a wireless device, in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204, which controls operation of the wireless device 202. The processor 204 may also be referred to as a central processing unit (CPU). The processor 204 may direct the wireless device 202 in performing operations 600 and 700 described below. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein, for example, operations 600 and 700.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
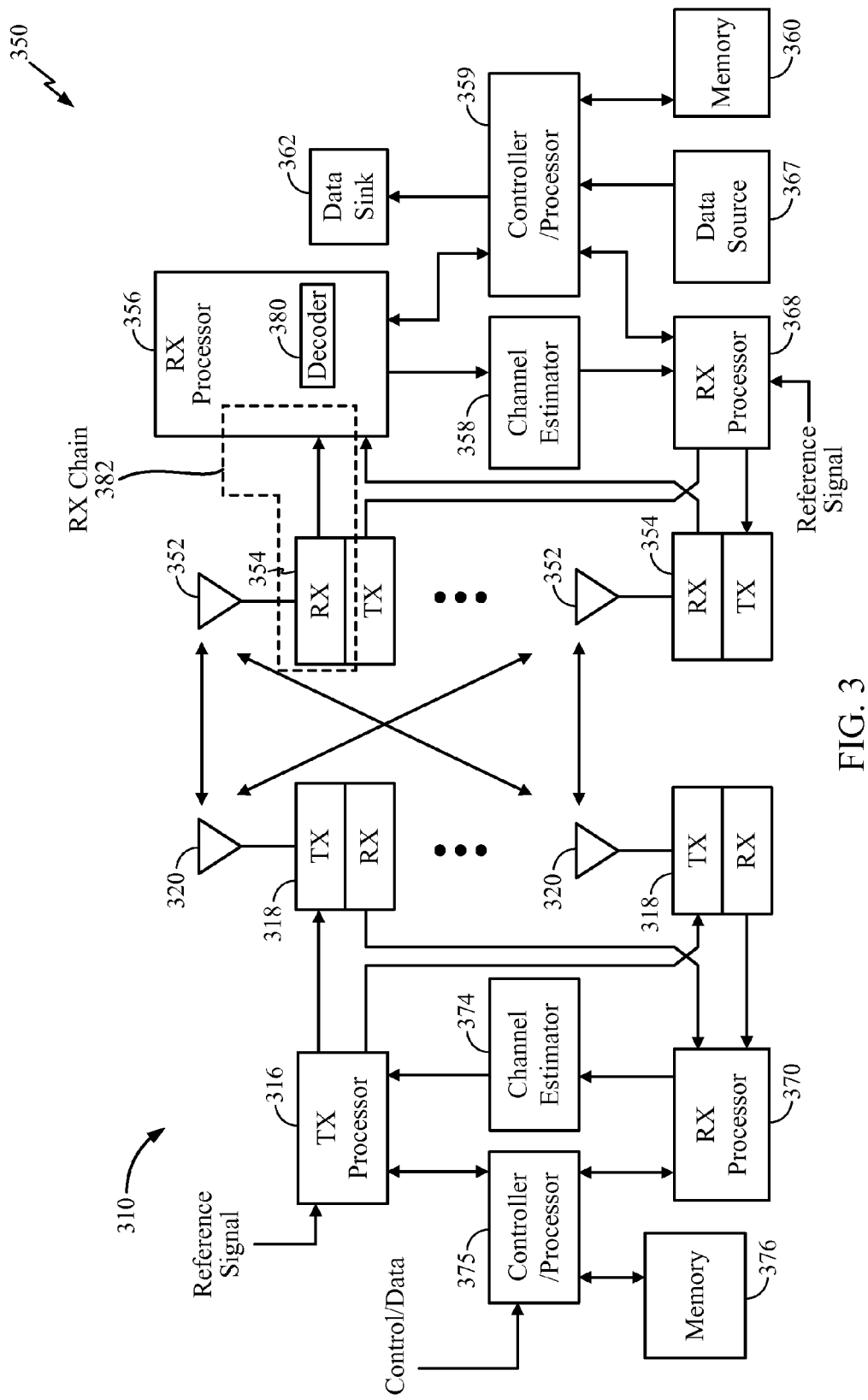
FIG. 3 illustrates a block diagram of an eNB in communication with a UE in an access network, in accordance with aspects of the present disclosure.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350. The controller/processor 375 may direct the eNB in performing operation 700 described below.

The TX processor 316 implements various signal processing functions for the L1 layer (i.e., physical layer). The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each transmitter/receiver module 354 receives a signal through its respective antenna 352. Each transmitter/receiver module 354 recovers information modulated onto an RF carrier and provides the information to the receiver (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the control/processor 359 provides demultiplexing between transport and logical channels, packet reassembly, deciphering, header decompression, and control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. According to certain aspects, the controller processor 359 may direct the UE in performing operation 600 described below. According to certain aspects, the memory 360 may store instructions for performing operation 600.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitter/receiver modules 354. Each transmitter/receiver module 354 modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

As will be explained in more detail herein, a transmitter, such as the eNB 310, may transmit one or more transport blocks (TBs) to a receiver, which may include one or more components of the UE 350. Receiver chain 382 and decoder 380 may perform aspects of the present disclosure. For example, and as illustrated in FIG. 3, the receiver component of the transmitter/receiver module 354 and RX processor 356 of the receiver chain 382 may identify an error in a received code block (CB) of a TB. In response to the identified error, a decoder 380 of the UE 350 may enter a throttle mode. The throttle mode may determine how one or more subsequent CBs are processed by the UE 350. Components of the receiver chain 382 may be understood in more detail with reference to the receiver chain 400 illustrated in FIG. 4 and described herein.

Figure 4:
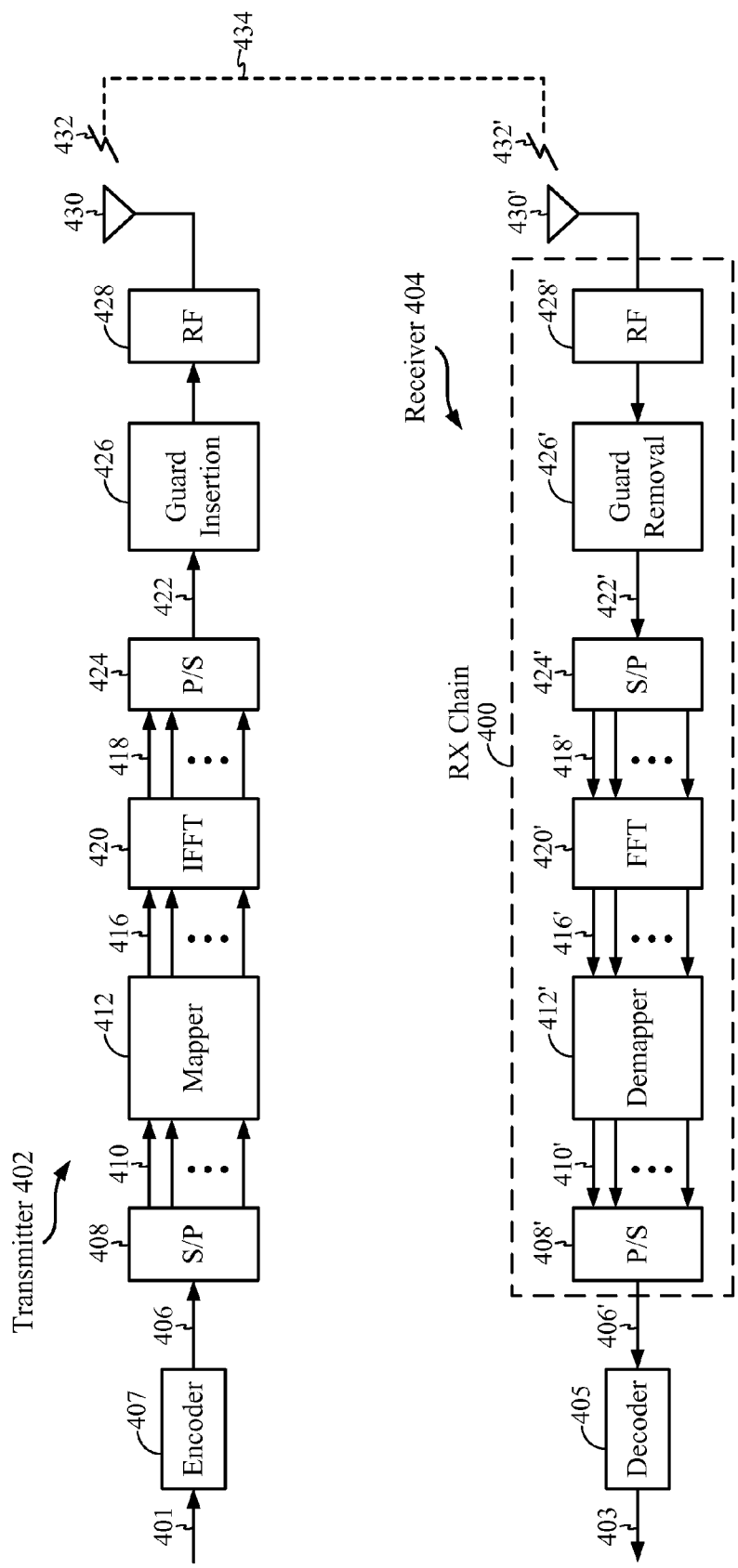
FIG. 4 illustrates an example transmitter and an example receiver that may be used within a wireless communication system, in accordance with certain aspects of the present disclosure.

FIG. 4 illustrates an example of a transmitter 402 that may be used within a wireless communication system 100. Portions of the transmitter 402 may be implemented in a transmitter 210 of a wireless device 202 as illustrated in FIG. 2. The transmitter 402 may be implemented in a base station 104, 310 for transmitting data 406 to a user terminal 106, 350 on a downlink 108. The transmitter 402 may also be implemented in a user terminal 106, 350 for transmitting data 406 to a base station 104, 310 on an uplink 110.

An encoder 407 may alter a signal (e.g., a bitstream) 401 into data 406. Data 406 to be transmitted is provided from the encoder 407 as input to a serial-to-parallel (S/P) converter 408. The S/P converter 408 may split the transmission data into N parallel data streams 410.

The N parallel data streams 410 may then be provided as input to a mapper 412. The mapper 412 may map the N parallel data streams 410 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 412 may output N parallel symbol streams 416, each symbol stream 416 corresponding to one of the N orthogonal subcarriers of the inverse fast Fourier transform (IFFT) 420. These N parallel symbol streams 416 are represented in the frequency domain and may be converted into N parallel time domain sample streams 418 by an IFFT component 420.

A brief note about terminology will now be provided. N parallel modulations in the frequency domain may correspond to N modulation symbols in the frequency domain, which may correspond to N mapping and N-point IFFT in the frequency domain, which may correspond to one (useful) OFDM symbol in the time domain, which may correspond to N samples in the time domain. The number of samples of one OFDM symbol in the time domain, $N_s$, may correspond to $N_{cp}$ (the number of guard samples per OFDM symbol)+N (the number of useful samples per OFDM symbol).

The N parallel time domain sample streams 418 may be converted into an OFDM/OFDMA symbol stream 422 by a parallel-to-serial (P/S) converter 424. A guard insertion component 426 may insert a guard interval between successive OFDM/OFDMA symbols in the OFDM/OFDMA symbol stream 422. The output of the guard insertion component 426 may then be upconverted to a desired transmit frequency band by a radio frequency (RF) front end 428. An antenna 430 may then be used in transmitting the resulting signal 432.

FIG. 4 also illustrates an example of a receiver 404 that may be used within a wireless device 202 that utilizes OFDM/OFDMA. Portions of the receiver 404 may be implemented in the receiver 212 of a wireless device 202. The receiver 404 may be implemented in a user terminal, such as user terminals 106 and 350, for receiving data 406 from a base station, such as base stations 104 and 310, on a downlink 108. For example, receiver chain 382 illustrated in FIG. 3 may include components illustrated in receiver chain 400. The receiver 404 may also be implemented in a base station, such as base stations 104 and 310, for receiving data 406 from a user terminal, such as user terminals 106 and 350, on an uplink 110.

The transmitted signal 432 is shown traveling over a wireless channel 434 from the transmitter 402 to the receiver 404. When a signal 432' is received by an antenna 430', the received signal 432' may be downconverted to a baseband signal by an RF front end 428'. A guard removal component 426' may then remove the guard interval that was inserted between OFDM/OFDMA symbols by the guard insertion component 426.

The output of the guard removal component 426' may be provided to an S/P converter 424'. The S/P converter 424' may divide the OFDM/OFDMA symbol stream 422' into the N parallel time-domain symbol streams 418', each of which corresponds to one of the N orthogonal subcarriers. A fast Fourier transform (FFT) component 420' may convert the N parallel time-domain symbol streams 418' into the frequency domain and output N parallel frequency-domain symbol streams 416'.

A demapper 412' may perform the inverse of the symbol mapping operation that was performed by the mapper 412 thereby outputting N parallel data streams 410'. A P/S converter 408' may combine the N parallel data streams 410' into a single data stream 406'. Ideally, this data stream 406' corresponds to the data 406 that was provided as input to the transmitter 402. Following the combination of the N parallel data streams 410' into a single data stream 406', the data stream 406' may be decoded into a decoded data stream 403 by decoder 405 through decoding methods including, for example, turbo decoding. Decoder 405 may correspond to decoder 380 of the RX processor 356 illustrated in FIG. 3.

Example Throttling Unattended Applications at User Devices

According to certain aspects of the present disclosure, traffic modification (e.g., throttling or restricting) of data flows triggered by applications running in the background with no (or little) user interaction (e.g., email or social application updates) is described. The traffic modification may be performed, for example, as part of radio access network (RAN) congestion mitigation. According to certain aspects of the present disclosure, traffic flow may be modified (e.g., throttled down or restricted), or traffic may be delayed, such that the modifications or delays may not affect the user experience.

Whether an application is running in the foreground or in the background, and therefore whether the traffic the application generates is attended or unattended, is typically only known at the UE and is, in most cases, dependent on the implementation of the application and user-specific settings.

If a UE were required to provide to the RAN or core network (CN), for each traffic flow, an indication of whether the flow is attended or unattended, the indications may require excessive transmission resources. The indications may be considered overhead on the RAN, which may be undesirable when the RAN is experiencing congestion.

If a UE were required to indicate whether the UE is attended or unattended, the indication may be smaller than providing indications regarding each traffic flow and may contribute less to RAN overhead. However, a UE indicating that the UE is attended or unattended may be a very coarse indication and may not be very useful, because even if the UE itself is attended, some applications running on the UE may not be attended.

In order to conserve transmission resources during times of network congestion, according to certain aspects of the present disclosure, a UE may modify (i.e., throttle) unattended traffic of some applications when the network requests modification (i.e., throttling) of unattended traffic. Exactly which applications are throttled may be determined based on user-specific settings and on operator configuration.

According to certain aspects, a UE may receive an indication of RAN congestion level. For example, a UE may receive an indication broadcast by the network that the network is or is not congested, or the UE may receive an indication of congestion sent by the network by means of a unicast signal or signals directed to one or more UEs.

According to certain aspects, a UE may receive an indication of network congestion and throttle, i.e. restrict, uplink traffic generated by one or more applications. For example, a UE may receive a broadcast from the UE's serving eNB indicating network congestion, and the UE may throttle uplink traffic generated by an email application on the UE.

According to certain aspects, the CN may trigger sending a unicast indication of network congestion or an indication to throttle certain unattended traffic for new application requests. For example, a CN entity may send an indication of network congestion to an eNB. In the example, the indication from the CN entity may trigger the eNB to send a unicast indication of network congestion to a served UE.

According to certain aspects, an indication of network congestion may also include an indication of how long to throttle unattended traffic. For example, an eNB may broadcast an indication of network congestion indicating that all of the UEs served by the eNB should throttle unattended traffic. In the example, the indication may also indicate that the UEs should throttle unattended traffic for a duration of ten seconds.

According to certain aspects, when a UE receives an indication to throttle unattended traffic, for each application, the UE may check a configuration for the particular application ID and determine if the application is subject to being throttled. If the application is subject to being throttled and is identified as unattended, the UE may throttle uplink traffic generated by the application. For example, a UE may be configured with a (e.g., semi-static) configuration of which applications are subject to being throttled, which applications are exempt from being throttled, and a default action (i.e. throttle or do not throttle) for applications that are not explicitly identified. In the example, the UE may identify an application as being subject to being throttled and as currently unattended, and the UE may throttle uplink traffic for the application. In the example, if an application is exempt from being throttled or is identified as attended, the UE may not throttle uplink traffic generated by the application.

According to certain aspects, a UE may obtain (e.g., receive) a configuration indicating certain applications are subject to being throttled, certain other applications are exempt from being throttled, and a default action for applications that are not explicitly identified from the network. For example, a UE may receive a configuration indicating that an email application and a photo streaming application are subject to being throttled, a voice over internet protocol (VoIP) application is exempt from being throttled, and the default action is to not throttle an application. In the example, the configuration may be received via Open Mobile Alliance (OMA) device management (DM) from the UE's serving eNB. In the example, the UE may receive an indication to throttle applications, determine that the photo streaming application and VoIP applications are not attended by the user, and throttle the photo streaming application while not throttling the VoIP application, based on the configuration.

According to certain aspects, a configuration indicating certain applications are subject to being throttled, certain other applications are exempt from being throttled, and a default action for applications that are not explicitly identified may be created for a UE based on user input. For example, a UE may present an interface to the user allowing the user to select actions for installed applications on the UE. In the example, the user may also be able to select a default action for applications for which the user does not select an action. In the example, the user may indicate that a photo streaming application is subject to being throttled, a voice over internet protocol (VoIP) application is exempt from being throttled, and the default action is to not throttle any other applications.

According to certain aspects, a UE, based on configuration and indications from the network, may limit data flows of applications running in the background without user interaction. For example, a UE may receive a configuration of applications subject to throttling, applications exempt from throttling, and a default action of not throttling from the network (e.g., via OMA DM). In the example, the UE may throttle certain unattended applications when requested by the network, with no input from the user.

According to certain aspects, when a UE receives a connection request from an application, the UE may determine whether the application is running in the background or in the foreground, and, if the application is running in the background and the network has requested modification (e.g., throttling) of traffic flow, the UE may delay completing the connection request for the application. The UE may be configured, for example, by the operator via OMA DM, with an indication of which applications are subject to delaying or throttling and which applications are exempt from delaying or throttling. In the example, the UE may receive information from the RAN or core network that triggers delaying connections of or throttling of the indicated applications. In the example, the UE may not throttle or delay connecting an application that is exempt from delaying or throttling.

Figure 5:
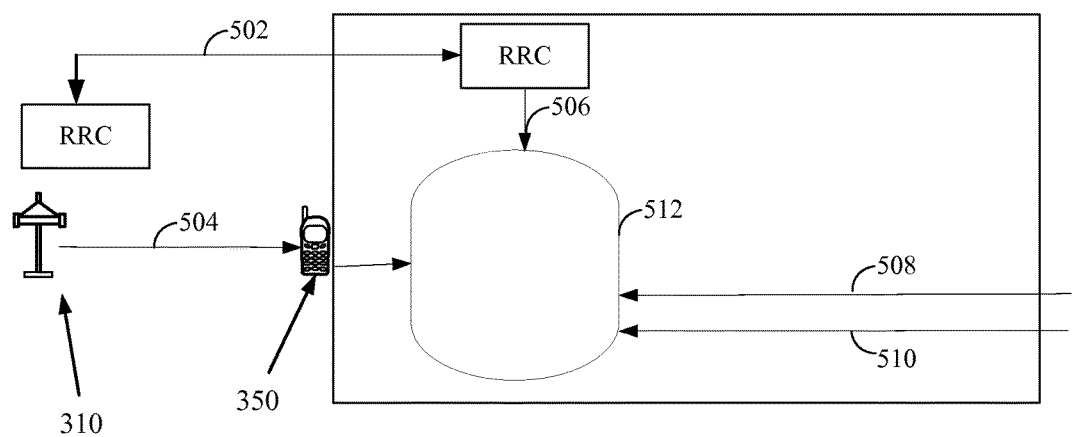
FIG. 5 illustrates example operations in a network, in accordance with certain aspects of the present disclosure.

FIG. 5 illustrates a UE 350 and eNodeB 310 in a network performing unattended application throttling, according to aspects of the present disclosure. The network may supply (e.g., via RRC signaling) configuration parameters 502, such as the application IDs to throttle or exempt from throttling, to the UE. The network may send a signal 504 to the UE to begin throttling unattended traffic. The UE may refer to the received configuration parameters in order to determine which applications to throttle and which to exempt at 506. The UE may throttle the traffic connections 508 and 510 from the unattended applications which are not exempt from throttling at 512.

Figure 6:
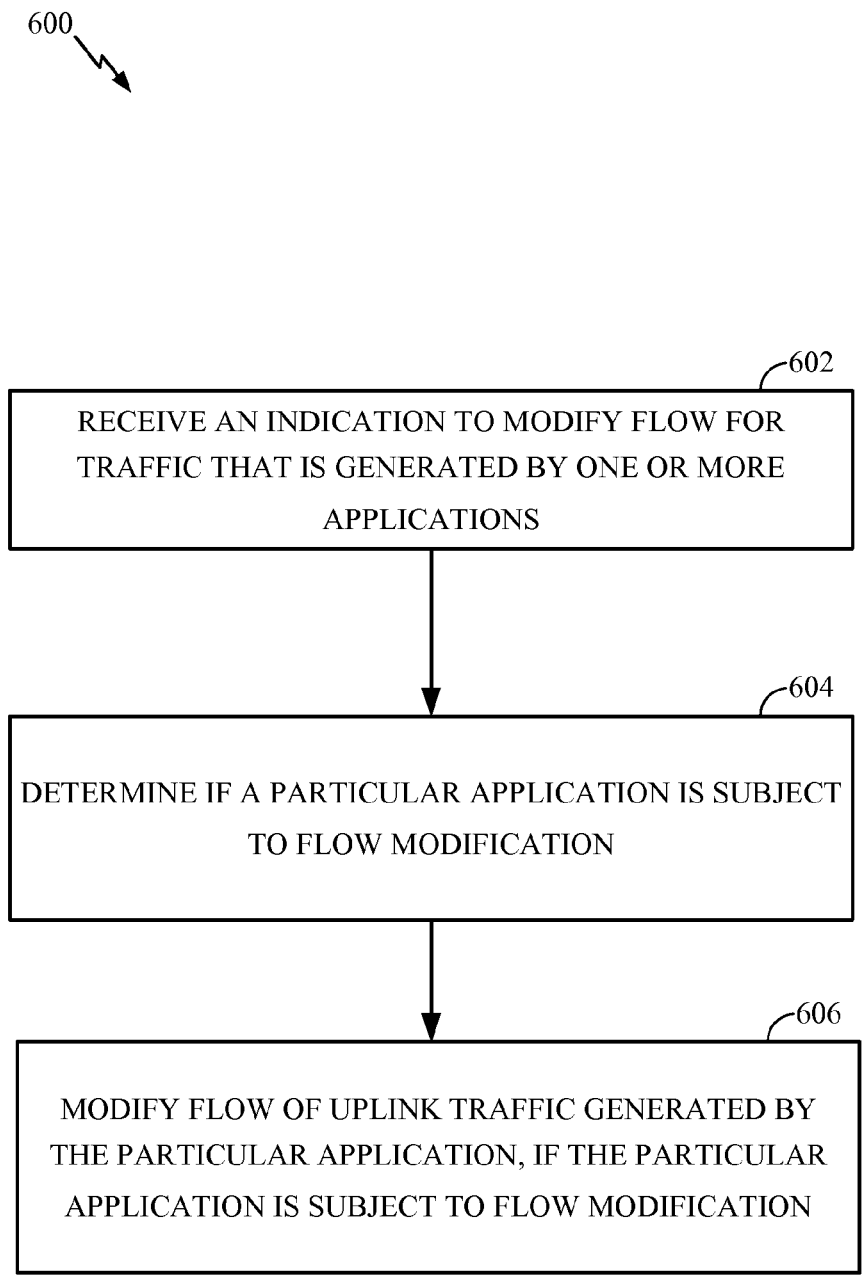
FIG. 6 is a flow diagram illustrating example operations performed by a user equipment (UE), in accordance with certain aspects of the present disclosure.

FIG. 6 is a flow diagram of example operations 600 for wireless communications, according to aspects of the present disclosure. The operations 600 may be performed, for example, by UEs 106 or 350.

The operations 600 may begin, at 602, by receiving an indication to modify flow for traffic generated by one or more applications. For example, a UE may receive a signal from the UE's serving eNB requesting the UE to throttle uplink traffic from unattended applications. At 604, the UE may determine if a particular application is subject to flow modification.

For example, the UE may refer to stored configuration information of an email application and determine that the email application is not exempt from flow modification. In the example, the UE may then determine if the email application is currently unattended. In the example, the UE may determine the email application is subject to flow modification, based on the determinations that the email application is not exempt from flow modification and is currently unattended.

At 606, the UE may modify flow of uplink traffic generated by the application, if the application is subject to flow modification. For example, the UE may throttle uplink traffic of the email application.

According to certain aspects, a UE may obtain information regarding which applications are subject to flow modification (e.g., restriction). For example, a UE may obtain information regarding which applications are subject to flow modification via network configuration or via a user configuration.

According to certain aspects, a UE may receive an indication to restrict (throttle down) flow for traffic subject to flow modification, and that indication may comprise an indication of traffic congestion. For example, a UE may receive a broadcast from the UE's serving eNB indicating that served UEs should begin flow modification and that the eNB is experiencing traffic congestion.

According to certain aspects, a UE may restrict flow for traffic subject to flow modification for a defined period of time or until receipt of an indication to not restrict flow. A UE may, for example, receive an indication to begin flow modification and delay a connection request for an unattended application. In the example, the UE may continue to delay the connection request until receiving an indication to terminate flow modification.

According to certain aspects, a UE may determine that traffic for a particular application is subject to flow modification based in part on determining whether the particular application is attended or unattended. For example, a UE may receive an indication to restrict (throttle down) flow for traffic subject to flow modification, determine that a first application is attended, and determine that a second application is unattended. In the example, the UE may modify (e.g., restrict) flow for the second application, while not modifying flow for the first application, based on the determinations that the first application is attended and the second application is unattended.

According to certain aspects, a UE may determine that a particular application is attended or unattended based on at least one of whether the particular application is on display or running in background, whether a user has not interacted with the UE for a certain period of time, whether a display of the UE is disabled, and whether traffic generated by the particular application is detected to be a keep-alive message or an update request. For example, a UE may determine that a first application is on display and is therefore attended, while traffic generated by a second application may be detected to be a keep-alive message and the UE may determine that the second application is unattended.

Figure 7:
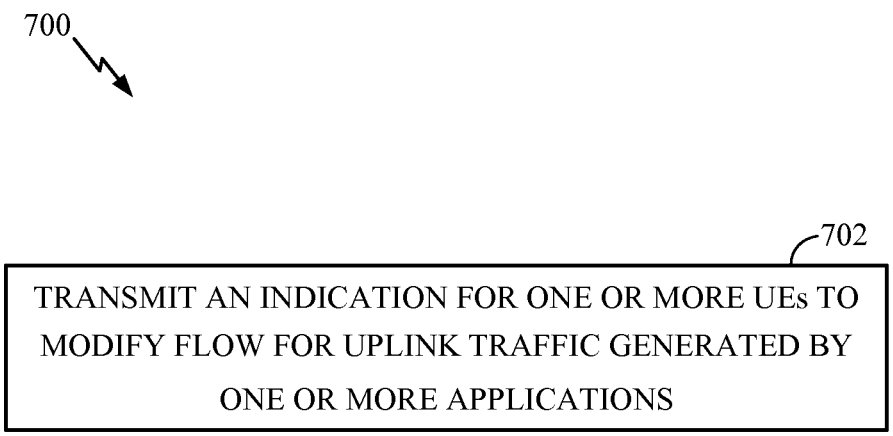
FIG. 7 is a flow diagram illustrating example operations performed by a base station (BS), in accordance with certain aspects of the present disclosure.

FIG. 7 is a flow diagram of example operations 700 for wireless communications, according to aspects of the present disclosure. The operations 700 may be performed, for example, by base stations 104 or 310. The operations 700 may be considered as complementary to operations 600 shown in FIG. 6.

The operations 700 may begin, at 702, by transmitting an indication for one or more UEs to modify flow for uplink traffic generated by one or more applications. For example, a base station may broadcast a signal to all served UEs indicating that the served UEs should begin modifying flow for uplink traffic generated by unattended applications.

According to certain aspects, a base station may also transmit information regarding which applications are subject to flow modification. For example, a base station may transmit list of applications subject to flow modification via RRC signaling.

According to certain aspects, a base station may also transmit information indicating one or more applications are exempt from flow modification even when an indication to modify flow is received by a UE. For example, a base station may transmit a list of applications that subject to flow modification and a list of applications exempt from flow modification via RRC signaling.

According to certain aspects, the indication for one or more UEs to modify flow for uplink traffic generated by one or more applications may comprise an indication of traffic congestion. For example, a base station may broadcast an indication of traffic congestion to all of the base station's served UEs as an indication that the UEs should begin flow modification.

According to certain aspects, the indication for one or more UEs to modify flow for uplink traffic generated by one or more applications may indicate that flow should be modified by delaying a connection request for the one or more applications. For example, a base station may broadcast an indication that served UEs should delay connection requests for unattended social media applications.

According to certain aspects, the indication for one or more UEs to delay connection requests may comprise an indication that delaying should continue for at least one of a period of time or until receipt of an indication to not restrict flow. For example, a base station may broadcast an indication to served UEs that connection requests for social media applications should be delayed for a period of ten seconds.

According to certain aspects, the indication to modify flow may be transmitted via a unicast transmission. For example, a base station may transmit to a particular UE that the UE should modify flow for a period of five seconds.

The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

As used herein, a phrase referring to "at least one of" a list of items refers to any combination of those items, including single members. As an example, "at least one of: a, b, or c" is intended to cover: a, b, c, a-b, a-c, b-c, and a-b-c.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communication performed by a user equipment (UE), comprising:
   receiving a wireless signal comprising an indication to modify flow for traffic generated by one or more applications;
   obtaining information regarding which applications are subject to flow modification, wherein the information indicates one or more applications that are exempt from flow modification even when an indication to modify flow is received;
   determining if a particular application is subject to flow modification based on the obtained information; and
   modifying flow of uplink traffic generated by the particular application, if the particular application is subject to flow modification.

2. The method of claim 1, wherein the modifying comprises restricting the flow of uplink traffic generated by the particular application.

3. The method of claim 2, wherein restricting flow comprises delaying a connection request for the particular application.

4. The method of claim 3, wherein the delaying comprises delaying for at least one of a period of time or until receipt of an indication to not restrict flow.

5. The method of claim 1, wherein the information is obtained via network configuration.

6. The method of claim 1, wherein the information is obtained via a user configuration.

7. The method of claim 1, wherein the indication comprises an indication of traffic congestion.

8. The method of claim 1, wherein the indication is received via a unicast transmission.

9. The method of claim 1, wherein the determining if a particular application is subject to flow modification comprises determining if the particular application is attended or unattended.

10. The method of claim 9, wherein determining if the particular application is attended or unattended is based on at least one of:
   whether the particular application is on display or running in background;
   whether a user has not interacted with the UE for a certain period of time;
   whether a display of the UE is disabled; and whether traffic generated by the particular application is detected to be a keep-alive message or an update request.

11. The method of claim 1, wherein:
the wireless signal further comprises an indication of a period to modify the flow; and
modifying the flow of uplink traffic generated by the particular application comprises modifying the flow of uplink traffic generated by the particular application during the period.

12. The method of claim 1, wherein the information is obtained from a configuration of the UE.

13. The method of claim 1, wherein modifying flow of uplink traffic comprises modifying flow of uplink traffic in response to receiving the wireless signal.

14. An apparatus for wireless communication by a user equipment (UE), comprising:
means for receiving a wireless signal comprising an indication to restrict flow for traffic generated by one or more applications;
means for obtaining information regarding which applications are subject to flow modification, wherein the information indicates one or more applications that are exempt from flow modification even when an indication to modify flow is received;
means for determining if a particular application is subject to flow modification based on the obtained information; and
means for modifying flow of uplink traffic generated by the particular application, if the particular application is subject to flow modification.

15. The apparatus of claim 14, wherein the modifying comprises restricting the flow of uplink traffic generated by the particular application.

16. The apparatus of claim 15, wherein restricting flow comprises delaying a connection request for the particular application.

17. The apparatus of claim 16, wherein the delaying comprises delaying for at least one of a period of time or until receipt of an indication to not restrict flow.

18. The apparatus of claim 14, wherein the information is obtained via network configuration.

19. The apparatus of claim 14, wherein the information is obtained via a user configuration.

20. The apparatus of claim 14, wherein the indication comprises an indication of traffic congestion.

21. The apparatus of claim 14, wherein the indication is received via a unicast transmission.

22. The apparatus of claim 14, wherein:
the wireless signal further comprises an indication of a period to modify the flow; and
the means for modifying the flow of uplink traffic generated by the particular application comprises means for modifying the flow of uplink traffic generated by the particular application during the period.

23. The apparatus of claim 14, wherein the means for obtaining the information comprises means for obtaining the information from a configuration of the UE.

24. The apparatus of claim 14, wherein the means for modifying flow of uplink traffic comprises means for modifying flow of uplink traffic in response to receiving the wireless signal.

25. An apparatus for wireless communication by a user equipment (UE), comprising:
a receiver configured to receive a wireless signal comprising an indication to restrict flow for traffic generated by one or more applications; and
at least one processor configured to:
obtain information regarding which applications are subject to flow modification, wherein the information indicates one or more applications that are exempt from flow modification even when an indication to modify flow is received,
determine if a particular application is subject to flow modification based on the obtained information, and
modify flow of uplink traffic generated by the particular application, if the particular application is subject to flow modification.

26. The apparatus of claim 25, wherein the at least one processor is configured to modify flow of uplink traffic in response to the receiver receiving the wireless signal.

27. The apparatus of claim 25, wherein the at least one processor is configured to obtain the information from a configuration of the UE.

28. A non-transitory computer readable medium having instructions stored thereon for:
receiving, by a user equipment (UE), a wireless signal comprising an indication to restrict flow for traffic generated by one or more applications;
obtaining information regarding which applications are subject to flow modification, wherein the information indicates one or more applications that are exempt from flow modification even when an indication to modify flow is received;
determining, by the user equipment (UE), if a particular application is subject to flow modification, based on the obtained information; and
modifying, by the user equipment (UE), flow of uplink traffic generated by the particular application, if the particular application is subject to flow modification.

29. The computer readable medium of claim 28, wherein the instructions for modifying, by the user equipment (UE), flow of uplink traffic comprise instructions for modifying, by the UE, flow of uplink traffic in response to receiving the wireless signal.

30. The computer readable medium of claim 28, wherein the instructions for obtaining the information comprise instructions for obtaining the information from a configuration of the UE.

* * * * *